May 10, 1932.  J. G. VINCENT ET AL  1,857,223

TRANSMISSION SYNCHRONIZING DEVICE

Filed Dec. 24, 1928  2 Sheets-Sheet 1

Inventors
JESSE G. VINCENT AND
ALFRED MOORHOUSE.

By
Attorney

May 10, 1932.  J. G. VINCENT ET AL  1,857,223
TRANSMISSION SYNCHRONIZING DEVICE
Filed Dec. 24, 1928  2 Sheets-Sheet 2
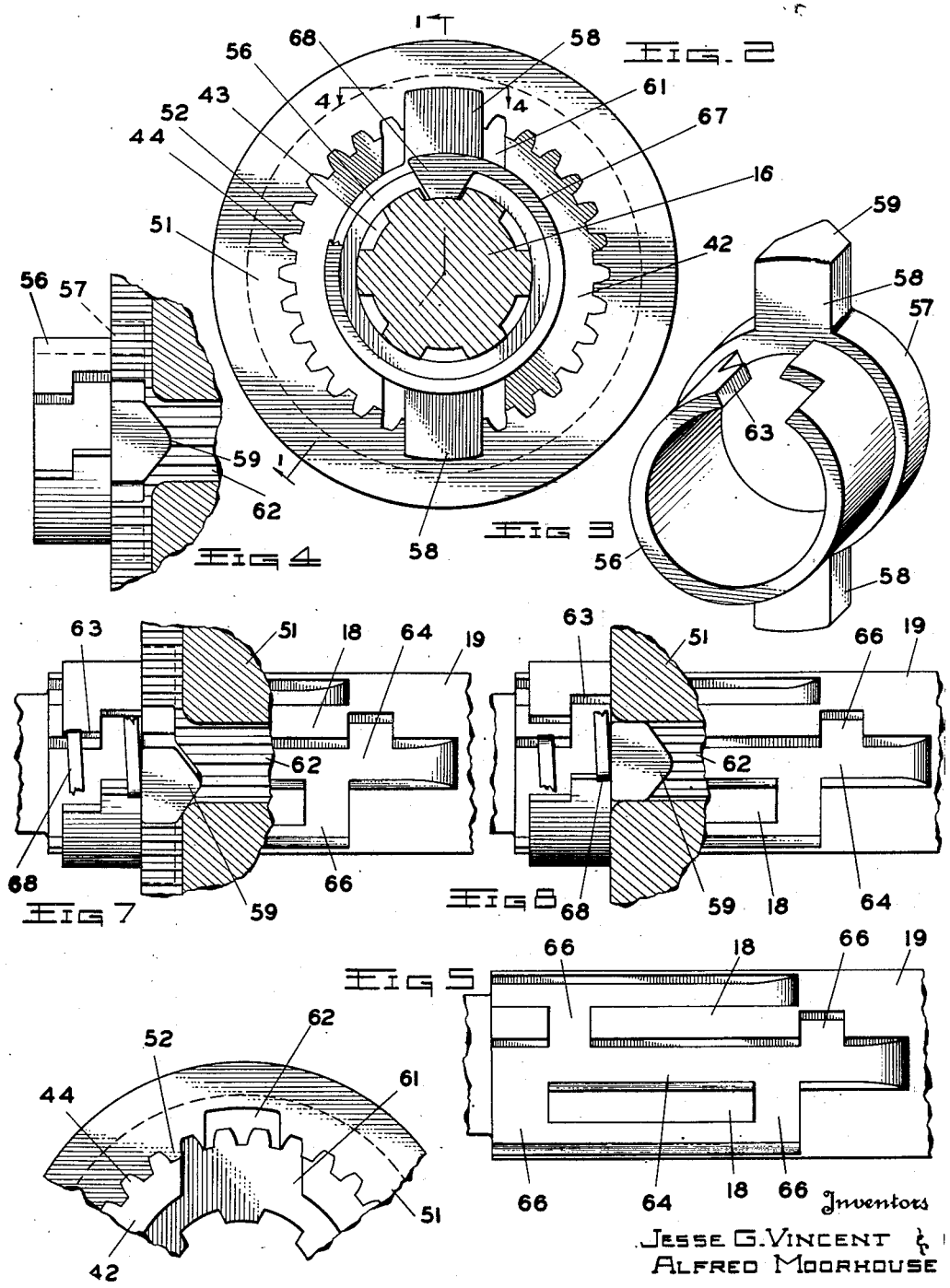
Inventors
Jesse G. Vincent &
Alfred Moorhouse Patented May 10, 1932

1,857,223

UNITED STATES PATENT OFFICE

JESSE G. VINCENT AND ALFRED MOORHOUSE, OF DETROIT, MICHIGAN, ASSIGNORS TO PACKARD MOTOR CAR COMPANY, OF DETROIT, MICHIGAN, A CORPORATION OF MICHIGAN

TRANSMISSION SYNCHRONIZING DEVICE

Application filed December 24, 1928. Serial No. 328,126.

This invention relates to motor vehicles and more particularly to the transmission mechanism thereof, and it has for one of its objects to provide synchronizing means for the power transmitting elements of such transmissions, whereby they are caused to approach the same speed before the establishment of a positive driving connection.

Another object of the invention is to provide a transmission having synchronizing means including an expansible helix operable to effect a frictional connection between transmission elements.

Another object of the invention is to provide such a synchronizing drag device in which the expansible movement of the helical frictional element shall be initiated by mechanism operable upon movement of the shiftable gear or clutch elements.

Another object of the invention is to provide such a transmission synchronizing device which shall be largely self-energizing after initial movement, being expanded into the operative position by power derived from motion of the transmission elements.

Another object of the invention is to provide a transmission having synchronizing means of the character designated in which a friction connection shall be established prior to positive connection of the elements, which friction connection shall be released upon such positive connection.

A further object of the invention is to provide such synchronizing means in which a helix is expanded or unwrapped to provide a powerful synchronizing effect tending to bring the relatively rotatable elements to substantially the same speed.

Other objects of the invention will appear from the following description taken in connection with the drawings, which form a part of this specification, and in which:

Fig. 2 is an enlarged view in section substantially on the line 2—2 of Fig. 1, the constant mesh driving gear being removed;

Fig. 3 is a perspective view of the actuating device;

Fig. 4 is a plan view of the actuating device shown in Fig. 3 showing a part of the clutch ring in section substantially on the line 4—4 of Fig. 2.

Fig. 5 is a plan view of part of the splined end of the transmission shaft showing the recesses for the abutments of the friction member;

Fig. 6 is a fragmentary view of the clutch ring showing the driving slots for the actuating means, and Figs. 7 and 8 are similar fragmentary views partly in section, of the transmission shaft, the synchronizer and the synchronizer actuator means, showing the parts in different positions assumed during operation of the device.

Figure 1:
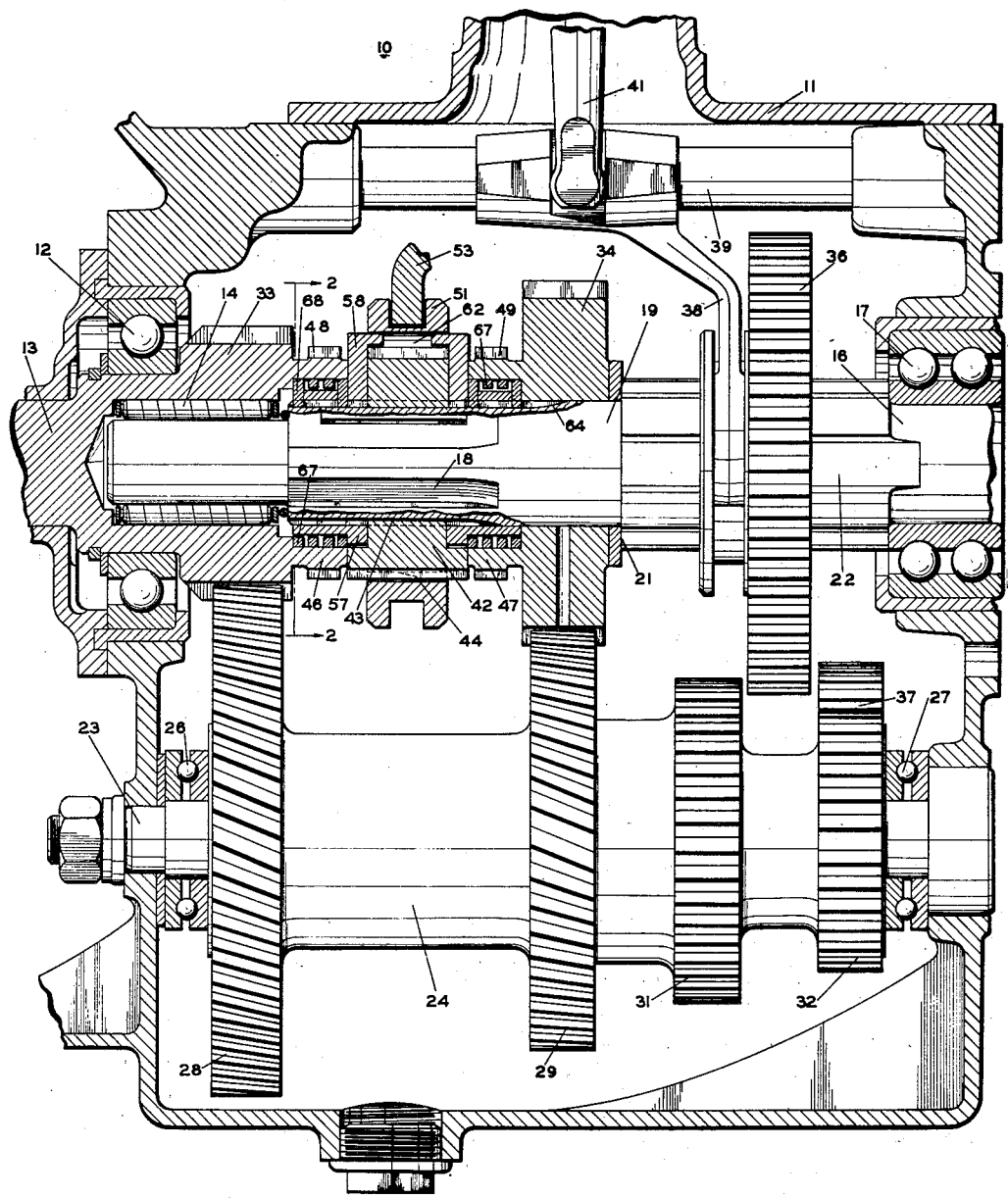
Fig. 1 is a view, partially in elevation and partially in longitudinal section substantially on the line 1—1 of Fig. 2, showing a motor vehicle transmission embodying this invention.

Referring to the drawings, at 10 in Fig. 1 is shown generally a transmission or change speed mechanism adapted to transmit power from the engine of a motor vehicle to the drive or propeller shaft thereof, having the usual closed case or housing 11, adapted to enclose the change speed gearing and to contain lubricant therefor. In the front wall of the housing 11 is mounted a bearing 12, of any suitable construction, but preferably of the annular type adapted to receive axial thrust, in which is journaled the rear end of a drive shaft 13, which may be the vehicle clutch shaft and which projects through the wall into the housing. The rear end of this shaft 13 is provided with a recess for a bearing 14, in which is journaled the forward end of a driven or transmission shaft 16. The rear end of the shaft 16 is journaled in a bearing 17, preferably also of the thrust receiving type, mounted in the rear wall of the housing 11. This shaft 16 is coaxial with the shaft 13 and projects through the rear housing wall, where it may terminate in a universal joint or be otherwise connected to drive the vehicle propeller shaft (not shown) in the well known manner.

The forward end of shaft 16, adjacent the portion journaled in the bearing 14, is provided with splines 18, and adjacent this splined portion is a plain cylindrical portion 19 terminating in a shoulder 21. Rearwardly of this shoulder the shaft 16 is of somewhat larger diameter and is provided with splines 22.

Below and to one side of the shaft 16, and parallel thereto, an arbor 23 is rigidly mounted in the housing 11, on which is rotatably mounted a gear spool or gear cluster 24, which is spaced from the front and rear housing walls by thrust bearings 26 and 27 respectively, and which constitutes the transmission countershaft. This countershaft cluster includes a constant mesh gear 28, a second speed gear 29, a first or low speed gear 31, and a reverse gear 32, of which the constant mesh driving and second speed gears 28 and 29 are preferably of the spiral bevel type, the others being of the usual spur tooth form. The gears 28 and 29 are in constant mesh respectively with a spiral bevel pinion 33 formed on the end of the clutch shaft 13, and with a spiral bevel gear 34 which is journaled to rotate on the cylindrical shaft portion 19 and is spaced thereon by the shoulder 21.

The first speed gear 31 is adapted to mesh with a spur toothed gear 36 slidably mounted on the splines 22, this gear 36 also being shiftable so as to be driven from the reverse gear 32 through an intermediate reverse gear 37, independently mounted in the housing in the usual manner.

Hence it will be understood that the countershaft 24 is continuously driven through the constant mesh gear train 33—28, as in the conventional transmission, and that low speed forward, or reverse, may be obtained by moving the gear 36 on the splines 22 to mesh either with the gear 31 or with the gear 37. Such sliding movement of gear 36 is effected in the well known way through a shifter fork 38 carried by a slidably mounted shifter rod 39, and actuated by a shifter lever 41.

It will also be noted that the second speed gear 34 is continuously rotated by the gear 29 on its bearing 19 on the shaft 16. To secure second speed, and high speed or direct drive of the transmission shaft 16, means is provided whereby either the gear 34 or the pinion 33 may be clutched to the shaft 16, depending on the speed desired. To this end a gear or clutch member 42 is mounted on the shaft 16 between the gears 33 and 34, and is adapted to drive this shaft through the splines 18, being provided for this purpose with internal splines 43. This clutch member 42 is also provided with external gear or clutch teeth 44.

The gears 33 and 34 have axially disposed annular projections 46 and 47, the outer diameters of which are equal to the diameter of the clutch member 42, and which are provided with external teeth 48 and 49 similar in size and in pitch to the teeth 44. A clutch ring 51 having internal teeth or splines 52 which may mesh with and drive the teeth 44, is slidably mounted on the member 42 and may be moved forwardly or rearwardly to selectively engage either the teeth 48 or the teeth 49. Such sliding movement of the ring 51 is effected by a shifter fork 53, similar to the fork 38, and connected to a shifter rod similar to rod 39, and operable by the lever 41. It will be readily understood that this device constitutes a toothed clutch whereby the teeth 52 may be moved to engage the teeth 44 and 48, thereby connecting gear 33 and member 42 to provide a direct drive, or to engage teeth 44 and 49 thereby connecting gear 34 and member 42 to provide a second or reduced speed drive through the gear trains 33—28 and 29—34.

Engagement of the teeth 52 with teeth 48 or teeth 49 can be effected without clash or shock only when the gear to be engaged and the clutch member are rotating at the same or substantially the same speed, which condition seldom obtains in practical vehicle operation. Usually, upon disconnection from the engine, the clutch shaft 13 spins, overrunning the transmission shaft 16 so that the vehicle operator must wait for it to slow down to the proper speed before he can shift his gears, and he must guess when that proper speed obtains. For this reason the operation of shifting gears is a delicate one, requiring considerable skill as is well known. To permit rapid and accurate gear changing without noise or damage of the toothed elements, this invention provides a synchronizing device adapted to bring the parts to be connected to substantially the same speed prior to the engagement of the clutch teeth. To this end a self-energized friction or drag device is located between the shaft 16 and each of the gears 33 and 34, being preferably arranged to engage the cylindrical inner wall of the recesses provided by the annular projections 46 and 47 respectively. As these friction or drag devices are identical in construction it is only necessary to describe one of them.

As illustrated, the synchronizing device comprises a drag or friction member, and an actuating member therefor adapted to support and control the drag or friction member. This consists of a sleeve 56 rotatably mounted on and surrounding the splines 18, and provided at one end with a flange 57 adapted to abut the clutch member 42. From this flange project two oppositely disposed arms 58, the ends of which have axially disposed portions, rounded to form a nose or pilot 59, as best shown in Figs. 3 and 4. By means of these pilots the actuating member may be moved rotatably with respect to the shaft or oscillated on its bearings on the splines 18. The arms 58 are seated in slots 61 provided in the face of the member 42, the sides of which constitute stops to limit the oscillatory movement, these slots being somewhat wider than the arms, as clearly shown in Fig. 2.

The nose portions 59 are adapted to cooperate with axially disposed grooves 62 formed in the clutch ring member 51, preferably by cutting away certain of the teeth 52 thereof, as best shown in Fig. 6. The sleeve 56 and its associated parts are thus mounted on and driven with the shaft 16, and in addition may be moved about the axis of the shaft. Such oscillatory movement is effected by the cam action of the groove 62 on the nose 59 as the clutch ring 51 is shifted axially in either direction. The sleeve portions 56 is axially slotted as at 63, one portion of the slot being staggered or offset with respect to the remainder, as shown in Fig. 3.

The groove between two of the splines 18 of shaft 16 is somewhat longer than the others, as indicated at 64 in Fig. 1, this groove being substantially under the slot 63. On either side of this goove 64 the splines are cut away for certain portions of their length forming circumferential grooves or recesses 66, these recesses being offset or staggered axially as clearly shown in Fig. 5.

Coiled upon and supported by each of the sleeve portions 56 is a resilient helical drag or friction member 67, preferably a coil spring of any suitable construction, having a radially disposed terminal portion or abutment 68 at each end adapted to project inwardly through the slot 63 into the recesses 66. This spring is wound in the direction opposed to the direction of rotation of the shaft, so that in the form illustrated it is left handed, and its dimensions are such that it will normally engage the cylindrical bore of the projection 46, or 47, with a moderate pressure. It will be evident that this pressure may be varied by circumferential movement of either end of the spring, movement in one direction tending to unwrap the helix, expand it in diameter and thus increase the pressure, and movement in the other direction tending to wrap up or contract the helix thus decreasing the pressure.

Such movement of the spring is effected by the action on the abutments 68 of an edge of the slot 63. The arrangement of these elements is such that the spring 67 will be unwrapped or expanded, either from one end or from the other, whenever there is any relative movement between the actuator sleeve 56 and the shaft 16, the end of the spring actuated depending on the direction of the relative movement. When there is no relative movement the spring is carried around with the sleeve in its normal position, and upon the cessation of such a relative movement, the spring is released and contracts to its normal position, wherein it exerts on the parts only the moderate drag required to secure initial friction.

The operation of the device may be better understood from an example. Assume that the operator has just shifted out of second gear so that the vehicle is coasting with the gears in neutral position as shown in Fig. 1, the shaft 13 being disconnected from the engine by disengagement of the vehicle clutch in the usual way (not shown). In this position the transmission shaft 16, the clutch member 42 and the clutch ring 51 are rotating clockwise, as viewed from the front end, at a speed determined by the speed at which the vehicle is moving, while the clutch shaft 13 with its teeth 48 is rotating in the same direction but at some different speed determined by the inertia of the shaft and the associated vehicle clutch elements. Usually the clutch shaft 13 will spin and overrun the shaft 16. Assuming that this is the case then the initial frictional drag on the spring 67 will tend to move the sleeve in a clockwise direction until the arm stops against the side of the groove 61. The parts are now in the position shown in Fig. 7, the rear abutment of the spring 67 engaging the edge of the slot 63, and the forward abutment engaging the flank of one of the splines 18. At the same time the nose 59 is disposed in the end of the groove 62 with its side against the wall thereof.

As the vehicle operator continues to move the clutch ring 51 forward toward the more rapidly moving direct drive clutch teeth 48, the groove 62 exerts a cam action on the nose piece 59, which rotates the sleeve against the direction of rotation of the assembly, the edge of the slot 63 moving the rear abutment 68 into the position shown in Fig. 8. This movement takes place against the initial frictional drag of the spring and is unopposed by the splines 18 because of the disposition of the recesses 66 in these splines. The rear spring abutment is thus angularly displaced with respect to the front abutment, and the spring is unwrapped against the frictional drag. This unwrapping causes an expansion in diameter of the spring and a great increase in pressure on the extension 46, which in turn greatly increases the synchronizing friction between the parts. The extension 46, and with it the clutch shaft 13, is thus frictionally connected to the shaft 16, and the friction rapidly reduces the speed of the shaft 13 until it is moving substantially at the speed of the shaft 16.

Continued movement of the clutch ring 51 engages the teeth 52 with the teeth 48, and as these teeth are now moving substantially in synchronism the engagement takes place smoothly and without shock. The vehicle is then in high gear and the drive takes place directly from the shaft 13 to the shaft 16 through the clutch elements described, so that the vehicle clutch may be reengaged to connect the engine to the wheels. As soon as the teeth 52 engage the teeth 48, the drive is taken through these teeth and the load is therefore removed from the spring 67, which contracts as previously described into its normal operating position. In the event that the transmission shaft 16 is over-running the clutch shaft 13, the relative movement between these parts is in the opposite direction so that the forward end of the spring is actuated rather than the rear end. The operation is, however, in all respects similar to that above described.

It will also be understood that in the operation of meshing the teeth 49 and 52 to drive the vehicle in second gear, a similar operation of the other spring 67 takes place, bringing the rotating parts to synchronous speed in the manner previously described.

It will be understood that the invention provides a transmission synchronizing device capable of exerting a heavy frictional force to bring the transmission elements to proper meshing speed, and one that is quite sensitive. It will also be understood that as soon as the twisting or unwrapping movement is initiated by the actuating device, and the transmission elements are frictionally coupled, further deformation of the helical spring member is assisted by the relative rotation of the parts, so that the synchronizer is to a large extent self-energized. For this reason the actuating mechanism is relieved of heavy pressures and can be of light and simple construction.

It will also be understood that the device is selective in character, operating in either direction depending on which of the transmission elements to be connected is over-running the other.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. The combination with a motor vehicle transmission having power transmitting members and means to connect said members in driving relation, of a resilient helix between said members adapted to frictionally engage one of said members, and an actuator for said helix controlled by relative movement between said members.

2. The combination with a motor vehicle transmission having aligned driving and driven members, and clutch means adapted to positively connect said members, of a drag device comprising a coiled member, an actuating member rotatably mounted with respect to said aligned members to expand said coiled member into frictional engagement with one of said aligned members, and means operable upon movement of the clutch means to control said actuating member.

3. The combination with a motor vehicle transmission having relatively rotatable members and clutch means to positively connect said members, of self-energizing means to frictionally connect the rotatable members comprising an expansible helix, and means operable in response to relative rotation between said members to initiate expansion of said helix.

4. The combination with a motor vehicle transmission having relatively rotatable members and clutch means to positively connect said members, of self-energizing means to frictionally connect the rotatable members comprising an expansible helix having lost motion connections adjacent its ends to one of said members and having peripheral frictional engagement with the other member, and actuating means rotatably movable about the axis of the first said member in response to movements of the clutch means to expand said helix in accordance with the relative movement of the rotatable members.

5. The combination with a transmission for motor vehicles including coaxially disposed toothed members and a clutch member adapted to connect said toothed members in driving relation, of a drag member between the toothed members comprising a helix expansible into frictional engagement therebetween, and means operable by said clutch member to expand the helix.

6. The combination with a transmission for motor vehicles including relatively rotatable members and a clutch adapted to connect said members in driving relation, of a drag device including a helical friction member between said rotatable members, an actuating member having a lost motion connection with one end of said friction member, and means to move said actuating member upon initial movement of said clutch to expand said friction member into frictional engagement with said rotatable members.

7. The combination with a transmission having relatively rotatable members and clutch means to positively connect said members, of an expansible helical drag member adapted to frictionally connect said members, and means to operably expand said helix upon movement of the clutch means, said means actuating the helix at one of its ends in accordance with the direction of relative rotation between said rotatable members.

8. The combination in a transmission synchronizing device having relatively rotatable elements, of a drag member connected to one element and expansible to frictionally engage the other element, and means operable in accordance with the direction of relative rotation to selectively actuate the drag member at its ends, to initiate the expansion of said drag member.

9. The combination with a motor vehicle transmission having driving and driven shafts and clutch means for positively connecting said shafts, one of said shafts having a splined portion, of a sleeve rotatably mounted on said splines and having a longitudinal slot, means to rotatably move said sleeve in response to movement of the clutch means, and a resilient helix surrounding the sleeve having end portions projecting through said slot whereby rotary movement of the sleeve in either direction expands said helix from one of its ends.

In testimony whereof we affix our signatures.

JESSE G. VINCENT.
ALFRED MOORHOUSE.